United States Patent [19]

Bobba

[11] Patent Number: 5,709,727
[45] Date of Patent: Jan. 20, 1998

[54] HEAT TRANSFER DEVICE

[75] Inventor: Krishna M. Bobba, Gahanna, Ohio

[73] Assignee: Owens-Corning Fiberglas Technology, Inc., Summit, Ill.

[21] Appl. No.: 634,469

[22] Filed: Apr. 18, 1996

[51] Int. Cl.$^6$ .............. C03B 37/10; C03B 5/44; C03B 37/085; C03B 5/26
[52] U.S. Cl. ............... 65/481; 65/498; 65/137; 65/326
[58] Field of Search .............. 65/481, 498, 356, 65/137, 326

[56] References Cited

U.S. PATENT DOCUMENTS

| | | |
|---|---|---|
| Re. 24,060 | 9/1955 | Russell . |
| 2,706,365 | 4/1955 | Stalego . |
| 2,947,028 | 8/1960 | Slayter . |
| 3,278,282 | 10/1966 | Jaray . |
| 3,656,929 | 4/1972 | Gidea ............... 65/129 |
| 4,050,916 | 9/1977 | Russell . |
| 4,270,941 | 6/1981 | Babbitt ............... 65/356 |
| 4,349,376 | 9/1982 | Dunn et al. ............... 65/356 |
| 4,541,853 | 9/1985 | Sullivan et al. . |
| 4,571,251 | 2/1986 | Sullivan et al. . |
| 5,244,483 | 9/1993 | Brosch et al. . |

Primary Examiner—Donald E. Ezaja
Assistant Examiner—Jacqueline A. Ruller
Attorney, Agent, or Firm—C. Michael Gegenheimer; Inger H. Eckert

[57] ABSTRACT

A bushing assembly is provided which is adapted to be positioned beneath a forehearth (30) to receive a stream of molten glass flowing from the forehearth (30). The assembly comprises a glass receiving block (76), a bushing (50) and at least one cooling element (82). The receiving block (76) is positioned adjacent to the forehearth (30) to receive the stream of molten glass flowing from the forehearth (30). The receiving block (76) has an orifice (72) through which the molten glass passes. The bushing (50) receives the stream of molten glass from the glass receiving block and supplies a plurality streams of molten glass to be drawn into continuous glass fibers. The at least one cooling element (82) extends into the stream of molten glass and transfers energy in the form of heat away from the molten glass.

20 Claims, 8 Drawing Sheets

HEAT TRANSFER DEVICE

TECHNICAL FIELD

This invention relates generally to a bushing assembly and, more particularly, to such an assembly having one or more cooling elements associated therewith for removing energy in the form of heat from a stream of molten glass passing through the bushing assembly.

BACKGROUND ART

In the manufacture of continuous glass fibers, glass forming batch ingredients are added to a melter in which they are heated to a molten condition. The molten glass travels from the melter to one or more bushings by way of a glass delivery system, e.g., a channel and a forehearth. Each bushing has a number of nozzles or tips through which streams of molten glass flow via gravity. Those streams are mechanically drawn to form continuous glass fibers by way of a winder or like device.

The temperature of the glass within the bushing must be sufficiently high such that the glass is in a fluid state. However, it must not be so high that it prevents the glass, after passing through the bushing tips, from cooling and becoming viscous enough for fiber forming. Thus, the glass must be quickly cooled or quenched after it flows from the bushing tips for glass fibers to be formed. If the cooling rate of the glass is too low, breakage of the glass will eventually occur causing a shut-down in the fiber forming process.

In order to deliver the molten glass to the bushing at an acceptable temperature such that quenching will occur, the molten glass can only be heated to a certain maximum temperature within the glass delivery system. However, it would be advantageous to heat the glass material to a higher temperature. One reason for this is that a higher molten glass temperature reduces the likelihood that devitrified glass crystals will form within the glass delivery system, e.g., in a forehearth or a delivery channel, which can migrate to the bushing and cause fiber breakout resulting in a shut-down of the fiber forming operation. Another reason is that higher glass temperatures result in improved "fining" of the glass, i.e., the removal of air bubbles from the glass material.

Accordingly, there is a need for an improved bushing assembly which is capable of receiving glass from a glass delivery system at a higher-than-normal temperature yet is capable of sufficiently cooling the glass to permit fiber forming to occur.

DISCLOSURE OF INVENTION

This need is met by the present invention, wherein a bushing assembly is provided which is capable of receiving molten glass from a glass delivery system at a temperature which is higher than normal yet is capable of sufficiently cooling the glass before it passes a significant distance into the bushing to permit fiber forming to occur. For example, for E-glass, the temperature of glass flowing from a forehearth just before it passes into a conventional bushing assembly typically falls within the range of 2275° to 2300° F. When the bushing assembly of the present invention is used, the temperature of glass flowing from the forehearth may be increased such that it falls within the range of 2300° to 2350° F.

In accordance with a first aspect of the present invention, a bushing assembly is provided which is adapted to be positioned beneath a forehearth to receive a first stream of molten glass from the forehearth. The assembly comprises a glass receiving block, a bushing and at least one cooling element. The receiving block is adapted to be positioned adjacent to the forehearth to receive the stream of molten glass flowing from the forehearth. The receiving block has an orifice through which the molten glass passes. The bushing receives the first stream of molten glass from the glass receiving block and has a plurality of nozzles through which the molten glass passes. The nozzles supply a plurality of second streams of molten glass to be drawn into continuous glass fibers. The at least one cooling element extends into the first stream of molten glass and removes energy in the form of heat from the molten glass. It also redirects the flow of the first stream to provide a more uniform temperature distribution throughout the stream of molten glass before it passes through the bushing nozzles.

Preferably, the bushing assembly further comprises a cooling coil which is associated with the at least one cooling element for conductively transferring heat away from the at least one cooling element.

In one embodiment of the present invention, the at least one cooling element comprises a cooling strip interposed between the receiving block and the forehearth. The cooling strip may comprise a generally planar strip having one or more bores through which at least a portion of the molten glass passes.

In another embodiment of the present invention, the at least one cooling element comprises first and second cooling elements which extend into a generally central portion of the first stream of molten glass to remove heat from the stream and redirect the flow of the stream to provide a more uniform temperature distribution in the stream. Third and fourth cooling elements may also be provided which are mounted within the receiving block and extend into lateral portions of the stream to further redirect the flow of the molten glass and to remove an additional amount of heat from the stream.

In a further embodiment of the present invention, the at least one cooling element comprises a thickened portion of a bushing screen associated with the bushing.

The cooling element may comprise a generally planar cooling strip, a cooling rod, a cooling tube or other similar structure.

In accordance with a second aspect of the present invention, a heat transfer device is provided for use with a bushing, a receiving block and a forehearth for removing energy in the form of heat from a stream of molten glass passing from the forehearth, through the receiving block and through the bushing. The heat transfer device comprises at least one cooling element extending into the stream of the molten glass for removing heat from the molten glass before the molten glass passes a significant distance into the bushing, i.e., before the glass passes more than one-half of the way into the bushing and, more preferably, before the glass passes more than one-fourth of the way into the bushing.

Accordingly, it is an object of the present invention to provide a bushing assembly adapted to be positioned beneath a forehearth and including at least one cooling element. It is a further object of the present invention to provide a heat transfer device for use with a bushing and a bushing block for removing heat from glass material passing through the bushing and the bushing block. It is another object of the present invention to provide a heat transfer device that redirects the flow of a stream of molten glass passing through a bushing assembly such that the temperature distribution in a cross-section of the stream taken completely through the stream is more uniform. These and

MODES FOR CARRYING OUT THE INVENTION

Figure 1:
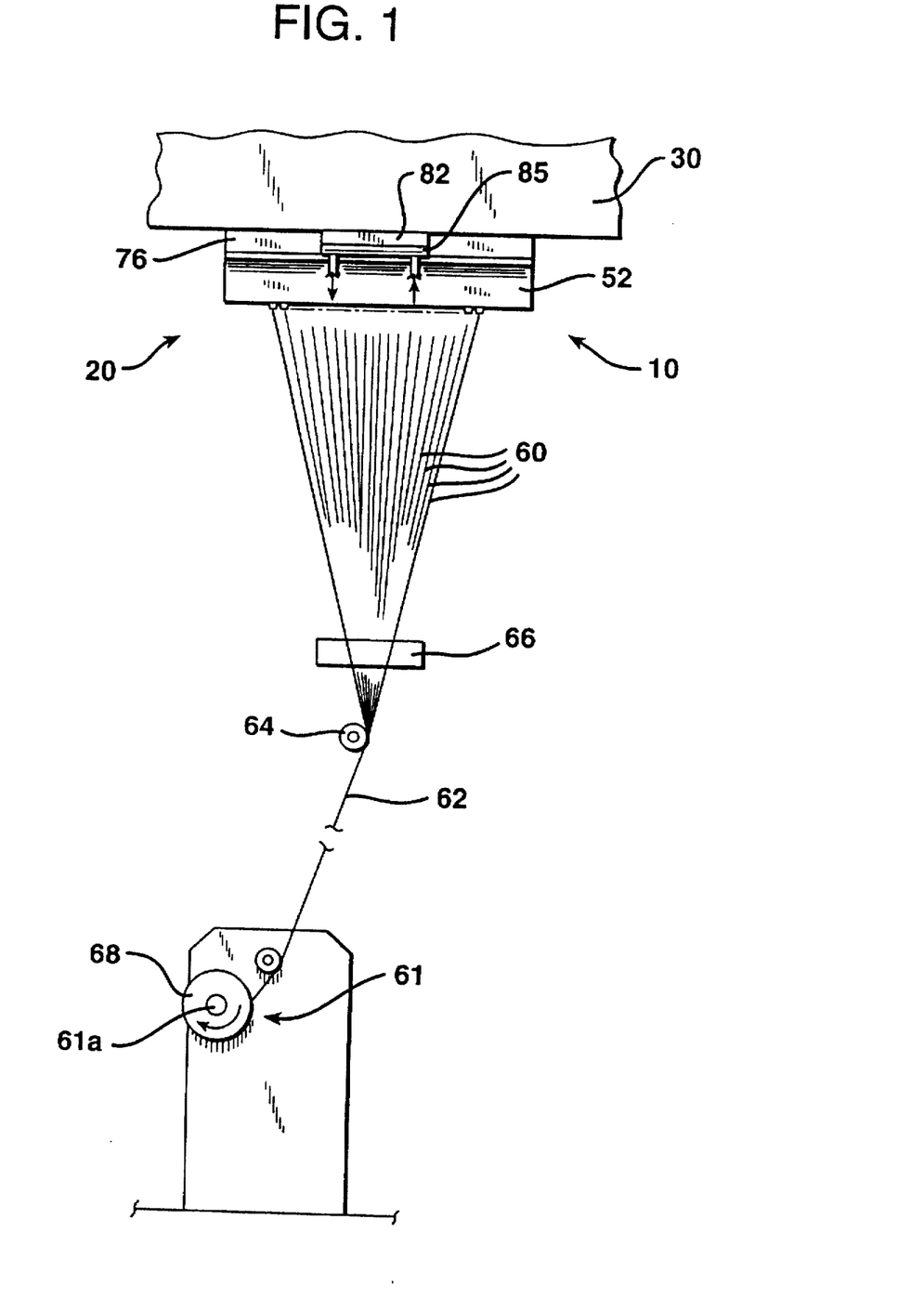
FIG. 1 is a side view of an apparatus constructed in accordance with the present invention for producing continuous glass filaments.

An apparatus 10 constructed in accordance with the present invention for producing continuous glass filaments is illustrated in FIG. 1. It includes a bushing assembly 20 which is positioned beneath a conventional forehearth 30 for receiving a first stream of molten glass 40 from the forehearth 30, see FIG. 2. The forehearth 30 receives the molten glass from a reciter (not shown). A glass delivery channel (not shown) may be located between the melter and the forehearth 30 to deliver the molten glass from the melter to the forehearth 30. The forehearth 30 is conventional in construction and is formed from refractory materials. The bushing assembly 20 is maintained in position under the forehearth 30 by conventional support structure (not shown).

The bushing assembly 10 includes a bushing 50 encased in refractory material 51 which, in turn, is encased in a metal frame 52. The bushing 50 is provided with a plurality of nozzles or tips 54 through which a plurality of second streams of molten glass are discharged, see FIGS. 2 and 3. The streams of glass are mechanically drawn to form continuous filaments 60 via a conventional winder device 61, see FIG. 1. In the illustrated embodiment, the filaments 60 are gathered into a continuous strand 62 at a gathering roller 64, after having received a protective coating or sizing composition from sizing applicator 66. The strand 62 is wound onto a rotating collet 61a of the winder device 61 to form a package 68.

Figure 2:
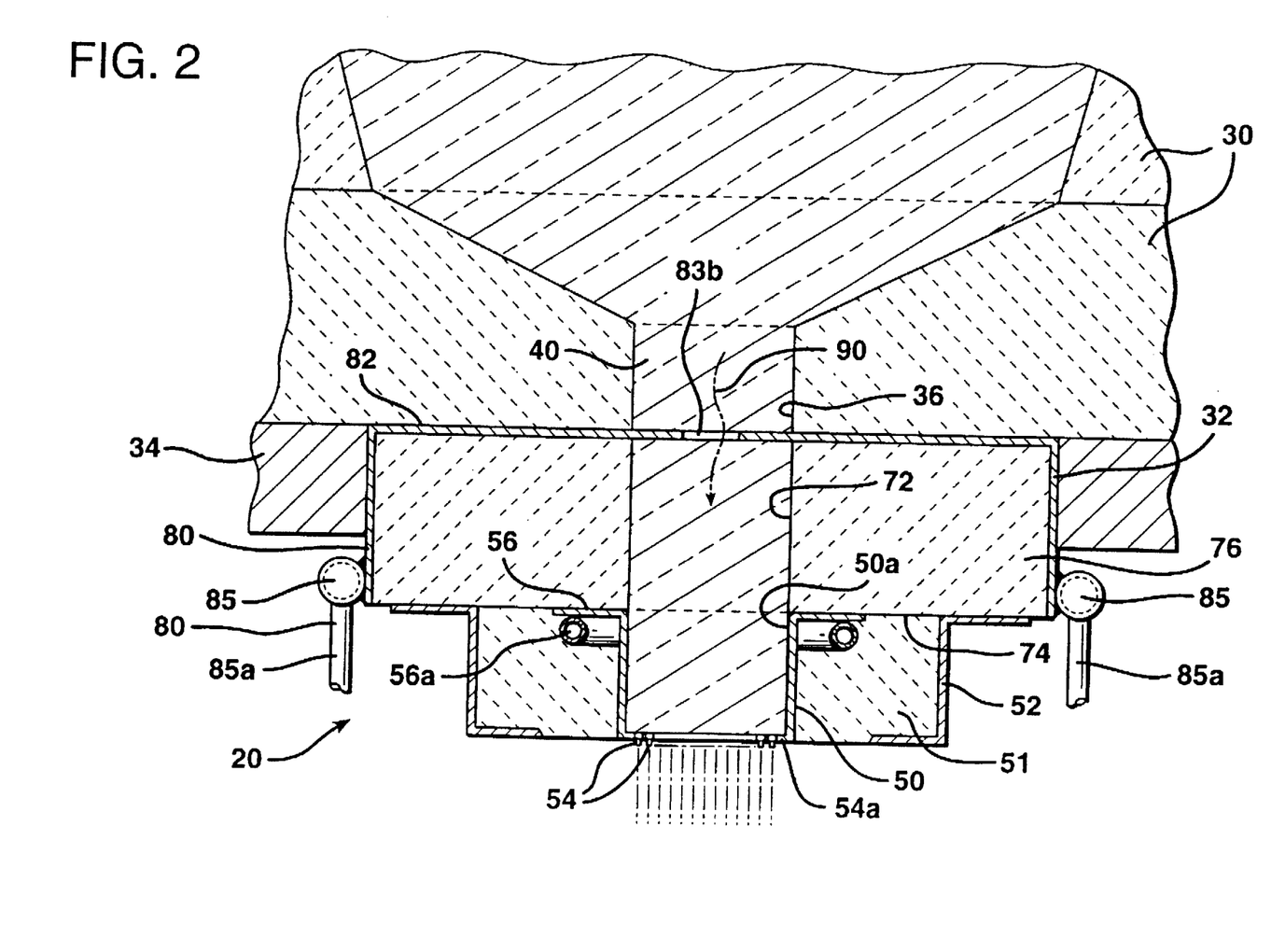
FIG. 2 is a cross-sectional end view of a bushing assembly constructed in accordance with a first embodiment of the present invention.
Figure 3:
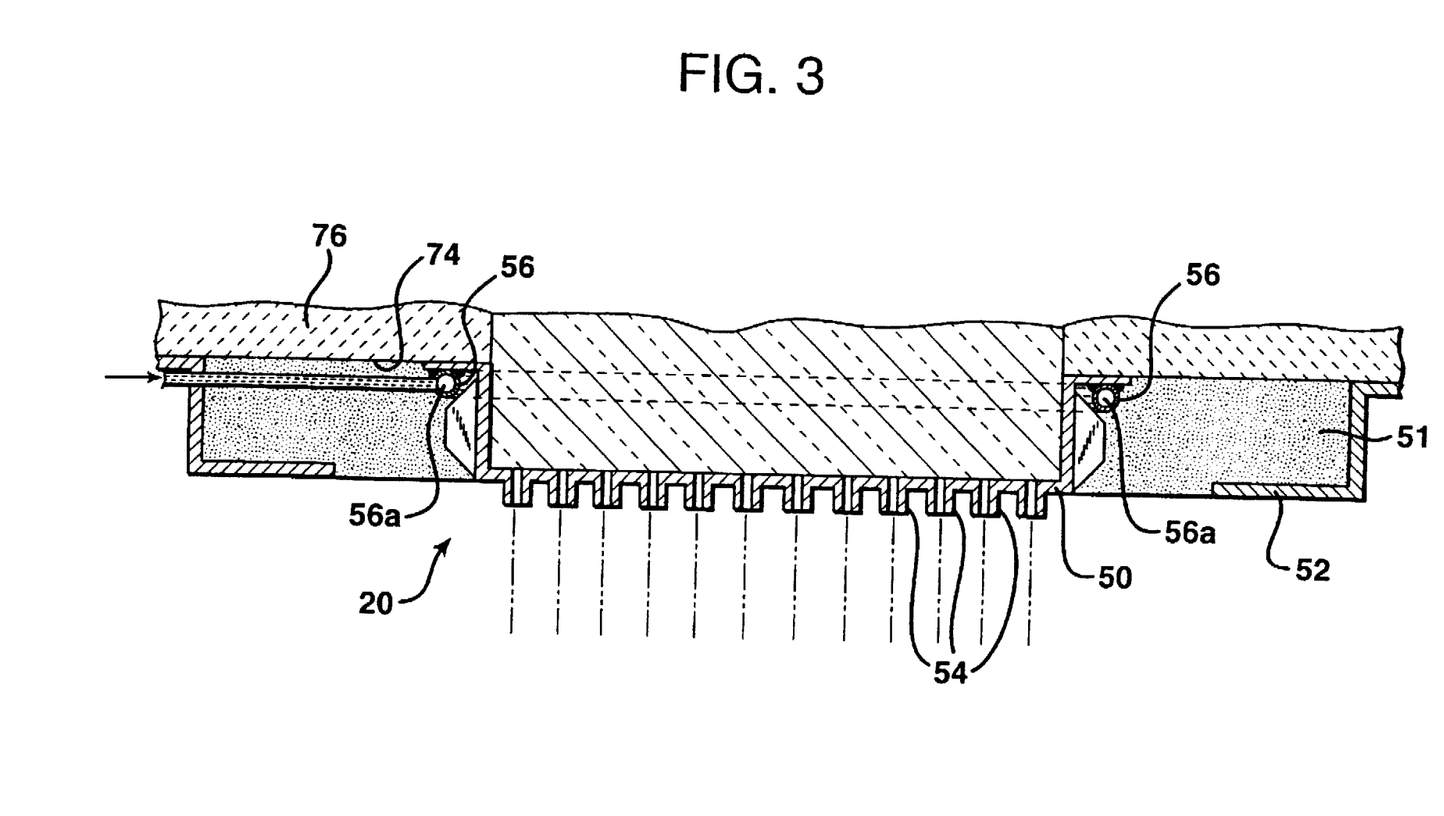
FIG. 3 is a cross-sectional side view of a portion of the bushing assembly illustrated in FIG. 2.

The bushing assembly 20 further includes a bushing gasket or bushing block 76 (also referred to herein as a receiving block) which is interposed between the bushing 50 and the forehearth 30, see FIG. 2. The bushing block 76 is received in a recess 32 defined in a lower portion 34 of the forehearth 30. The block 76 includes an orifice 72 which, when the bushing block 76 is received in the forehearth recess 32, is in general alignment with an opening 36 in the forehearth 30 through which the first stream 40 passes. Hence, the orifice 72 receives the first stream of molten glass 40 flowing from the opening 36 in the forehearth 30. The bushing block 76 is formed from a refractory material, such as Zircon.

The bushing 50 includes a flange 56 which contacts the underside 74 of the bushing block 76. A cooling coil 56a is weldably or otherwise secured to the underside of the bushing flange 56 and extends about substantially the entire perimeter of the flange 56. The cooling coil 56a communicates with a cooling fluid source (not shown) which provides a cooling fluid, e.g., water, to the cooling coil 56a. As the cooling fluid circulates through the cooling coil 56a, glass material which makes its way between the bushing flange 56 and the bushing block 76 substantially freezes or solidifies to effect a seal between the bushing block 76 and the bushing 50.

Located below each bushing 50 is a heat removal apparatus (not shown) which is adapted to remove heat from the fiber forming region below each bushing 50. The heat removal apparatus may comprise a plurality of fins which are conductively associated with one or two water-cooled manifolds. For example, the heat removal apparatus may be constructed in the manner described in either of commonly assigned U.S. Pat. Nos. 4,541,853 and 4,571,251, the disclosures of which are hereby incorporated by reference.

Figure 4:
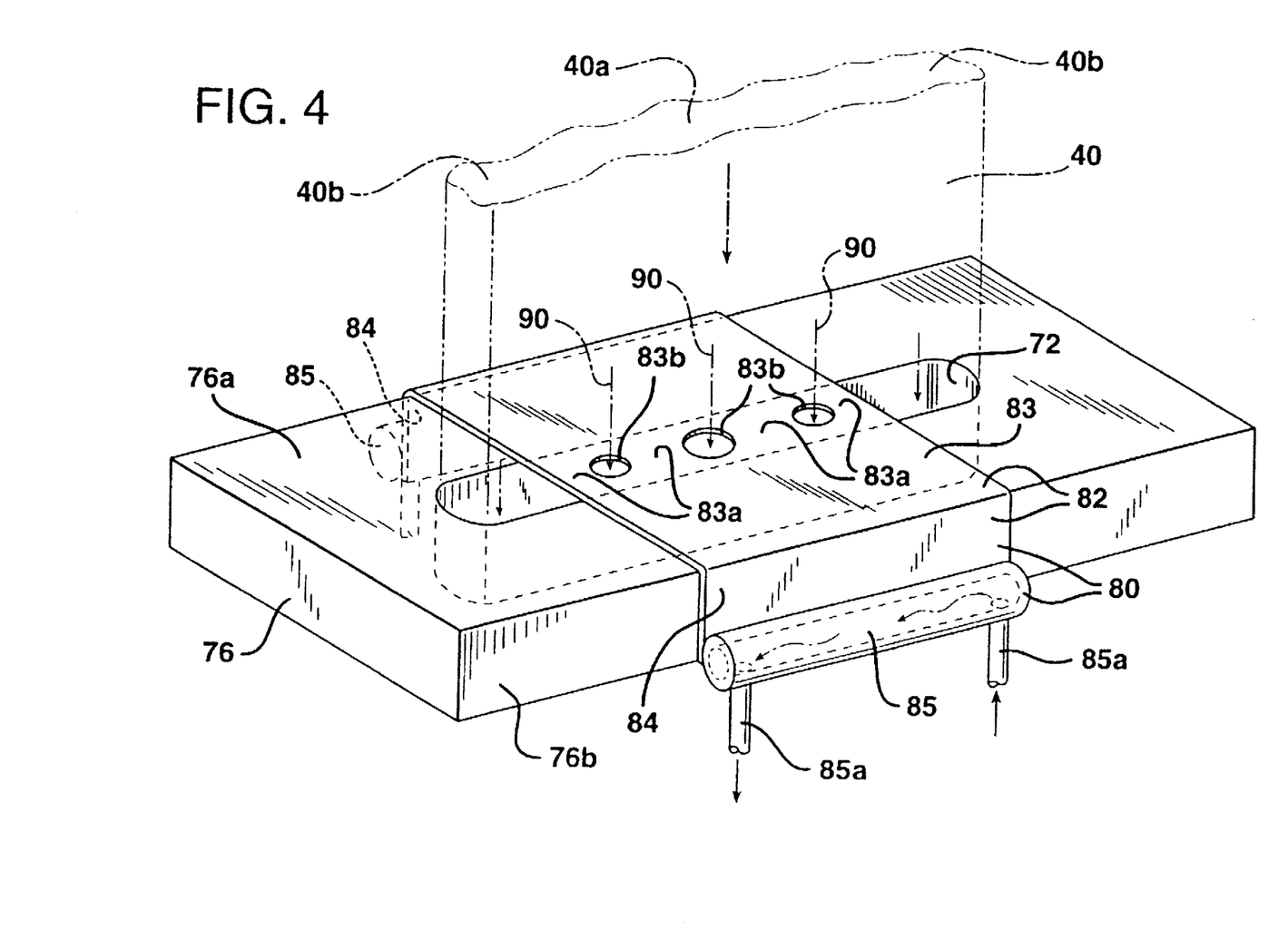
FIG. 4 is a perspective view showing the heat transfer device illustrated in FIGS. 1 and 3.

The bushing assembly 20 additionally includes a heat exchanger or heat transfer device 80 which acts to remove heat from the first stream of molten glass 40 before the molten glass passes into the bushing 50, see FIGS. 2 and 4. While the heat transfer device 80 illustrated in FIGS. 2 and 4 removes heat from the glass before it passes into the bushing 50, it is contemplated by the present invention that the heat transfer device may be configured such that it removes heat from the stream 40 below the entrance 50a of the bushing 50 but preferably before the stream 40 passes a significant distance into the bushing 50, i.e., before it passes one-half of the way into the bushing 50 and, more preferably, before it passes one-fourth of the way into the bushing 50. Because heat is removed from the stream 40 before it passes a significant distance into the bushing 50, the glass in the melter and the glass delivery system, i.e., the forehearth 30 and the glass delivery channel (not shown), can be heated to a higher-than-normal temperature without adversely affecting the fiber forming operation. Higher-than-normal glass temperatures make it less likely that devitrified glass crystals will form within the glass delivery system, which can migrate to the bushing 50 and cause fiber breakout resulting in a shut-down of the fiber forming operation. Further, highly crystallizing glasses which heretofore were not economical to fiberize, can now be formed into fibers in a cost-effective manner. It should also be noted that higher glass temperatures result in improved "fining" of the glass, i.e., the removal of air bubbles from the glass material before it reaches the bushing 50.

The heat transfer device 80 also acts to redirect the flow of the molten glass in the first stream 40 to effect mixing of the molten glass. Glass material located in a lower temperature portion 40b in a central or higher temperature portion 40a of the stream 40, is at a higher temperature than glass material located along outer edges of the stream 40. Thus, the heat transfer device causes higher temperature material to be redirected toward the outer edges of the stream 40 and vice versa. Hence, the temperature distribution of a horizontal cross-section of the stream 40 taken below the heat transfer device 80 should be more uniform than the temperature distribution of a horizontal cross-section of the stream taken above the heat transfer device 80. Consequently, centrally located bushing tips 54 should receive molten glass at a temperature which is substantially the same as the temperature of the glass received by bushing tips 54 located along outer portions of the bushing 50. Because glass flow through the bushing tips 54 is a function of glass temperature, glass flow through all of the bushing tips 54 should be more uniform.

In the embodiment illustrated in FIGS. 2 and 4, the heat transfer device 80 comprises a plate 82 (also referred to herein as a cooling element) having an upper section 83 which is positioned over an upper portion 76a of the bushing block 76. The upper section 83 also extends across a central portion of the orifice 72 formed in the bushing block 76. End sections 84 of the plate 82 extend along side portions 76b of the bushing block 76 and are weldably or otherwise connected to cooling coils 85. The cooling coils 85 communicate with a cooling fluid source (not shown) via inlet and outlet tubes 85a and act to conductively remove heat from the plate 82. The plate 82 is frictionally or adhesively secured to the bushing block 76.

The upper section 83 of the plate 82 is provided with openings 83b through which portions of the molten glass stream 40 pass, as indicated by arrows 90. Other portions of the stream 40 contact an exposed portion 83a of the upper section 83. Heat is removed from the stream 40 when the molten glass contacts and passes over the exposed portion 83a of the plate 82. Also, mixing of the molten glass occurs as a result of portions of the stream 40 contacting and flowing around the exposed portion 83a of the upper section 83. Hence, the temperature distribution of a horizontal cross-section of the stream 40 taken below the heat transfer device 80 should be more uniform than the temperature distribution of a horizontal cross-section of the stream taken above the heat transfer device 80.

Figure 5:
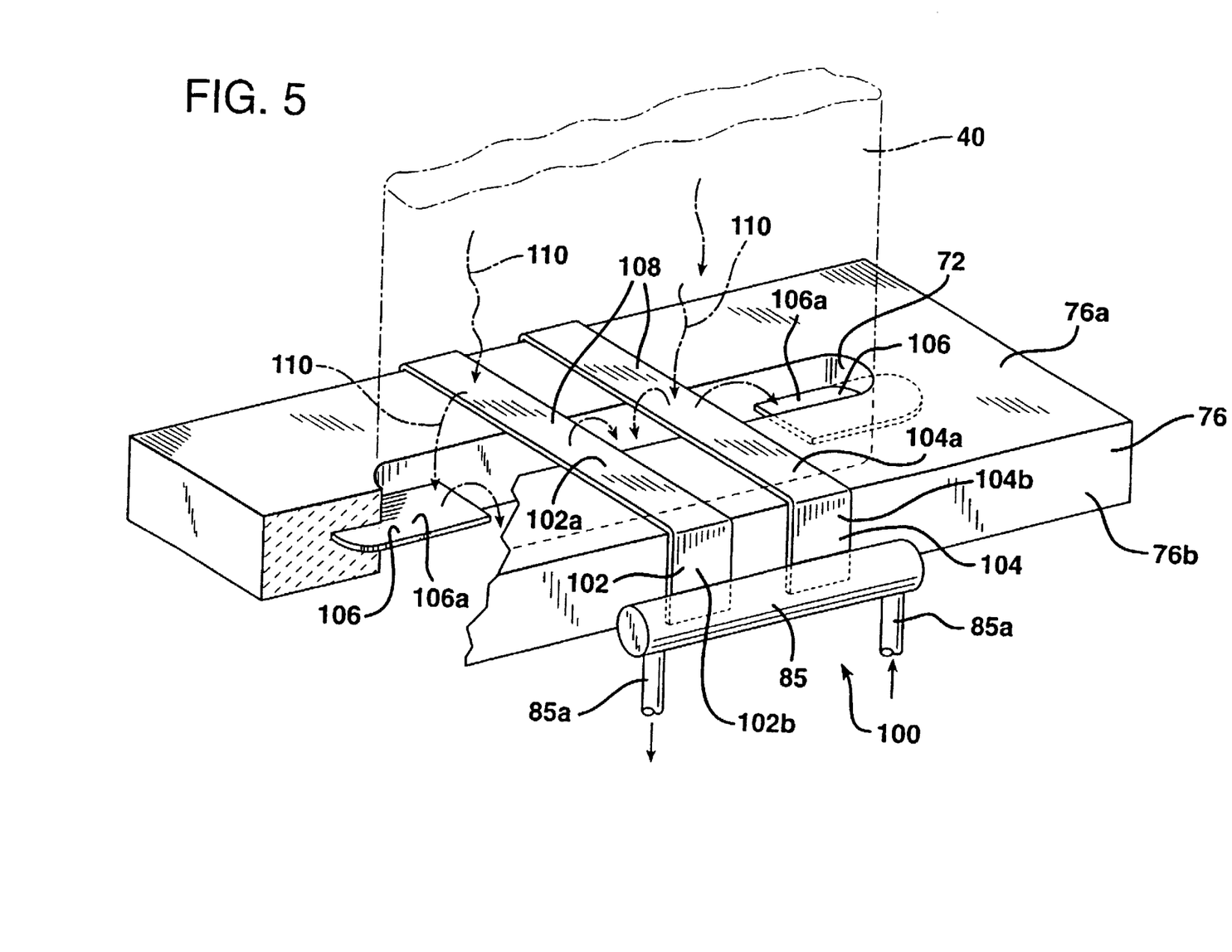
FIG. 5 is a perspective view of a heat transfer device constructed in accordance with a second embodiment of the present invention.

A heat transfer device 100 formed in accordance with a second embodiment of the present invention is shown in FIG. 5, wherein like reference numerals indicate like elements. The heat transfer device 100 includes first and second cooling elements 102 and 104 which are spaced apart from one another to permit molten glass material to flow between them. The first and second cooling elements 102 and 104 have upper sections 102a and 104a which are positioned over an upper portion 76a of the bushing block 76. The upper sections 102a and 104a also extend across a central portion of the bushing block orifice 72. End sections 102b and 104b of the elements 102 and 104 extend along side portions 76b of the bushing block 76 and are weldably or otherwise connected to cooling coils 85. The cooling coils 85 communicate with a cooling fluid source (not shown) via inlet and outlet tubes 85a and act to conductively remove heat from the cooling elements 102 and 104. Side cooling elements 106 are also provided which are embedded within the bushing block 76 and extend into the orifice 72 so as to contact lateral portions of the molten glass stream 40, see FIG. 5.

Portions of the molten glass 40 contact exposed portions 108 of the upper sections 102a and 104a of the cooling elements 102 and 104 as well as exposed portions 106a of the side cooling elements 106, as indicated by arrows 110 in FIG. 5. Heat is removed from the stream 40 when the molten glass contacts and passes over the exposed portions 108 and 106a of the cooling elements 102, 104 and 106. Also, mixing of the molten glass occurs as a result of portions of the stream 40 contacting and flowing around the exposed portions 108 and 106a. Hence, the temperature distribution of a horizontal cross-section of the stream 40 taken below the heat transfer device 100 should be more uniform than the temperature distribution of a horizontal cross-section of the stream taken above the heat transfer device 100.

Figure 6:
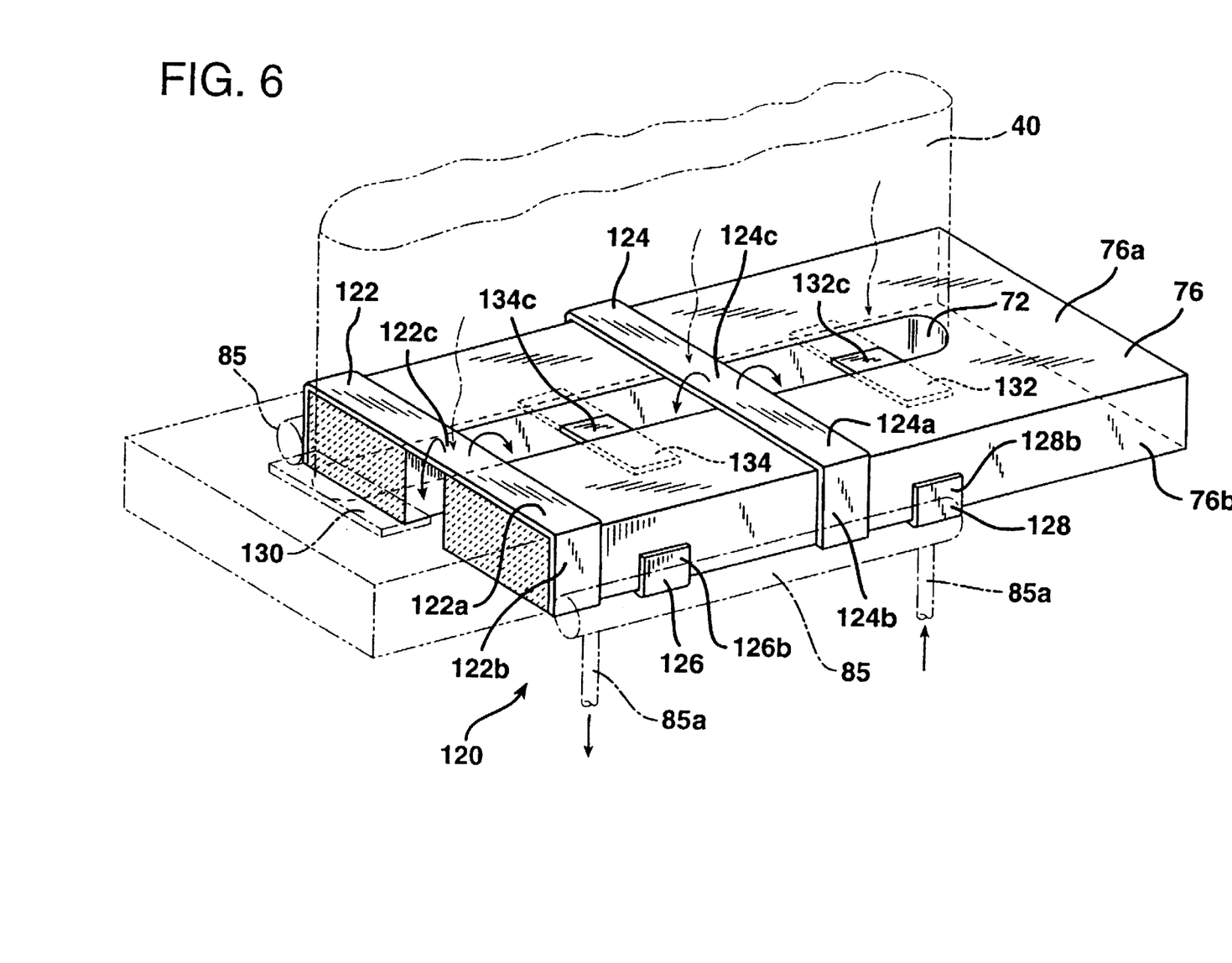
FIG. 6 is a perspective view of a heat transfer device constructed in accordance with a third embodiment of the present invention with a portion of the bushing block shown in phantom.
Figure 6A:
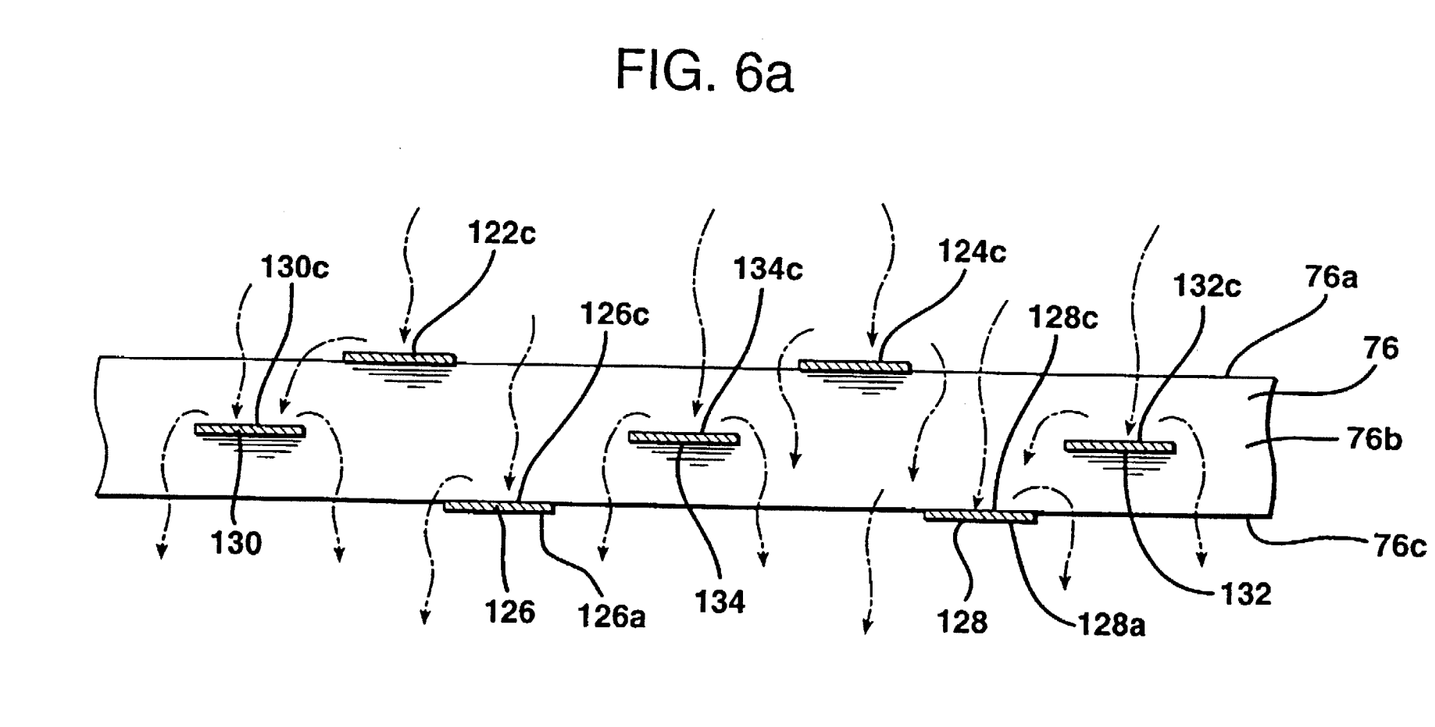
FIG. 6a is a view through the orifice in the bushing block in FIG. 6 and showing in cross section portions of the heat transfer device.

A heat transfer device 120 formed in accordance with a third embodiment of the present invention is shown in FIGS. 6 and 6a, wherein like reference numerals indicate like elements. The heat transfer device 120 includes first and second upper cooling elements 122 and 124 and third and fourth lower cooling elements 126 and 128. The upper cooling elements 122 and 124 have main sections 122a and 124a which are positioned over an upper portion 76a of the bushing block 76. The third and fourth lower cooling elements 126 and 128 have main sections 126a and 128a which engage a lower portion 76c of the bushing block 76, see FIG. 6a. The main sections 122a, 124a, 126a and 128a also extend across the bushing block orifice 72. End sections 122b, 124b, 126b and 128b of the elements 122, 124, 126 and 128 extend along side portions 76b of the bushing block 76 and are weldably or otherwise connected to cooling coils 85. The cooling coils 85 communicate with a cooling fluid source (not shown) via inlet and outlet tubes 85a and act to conductively remove heat from the cooling elements 122, 124, 126 and 128.

Side cooling elements 130 and 132 are also provided along with an intermediate cooling element 134. Each of the cooling elements 130, 132 and 134 is partially embedded within the bushing block 76 and may be frictionally, adhesively or otherwise maintained in the bushing block 76. The side elements 130 and 132 extend into the orifice 72 so as to engage lateral portions of the molten glass stream 40. The intermediate cooling element 134 engages a central portion of the molten glass.

The cooling elements 122, 124, 126, 128, 130, 132 and 134 are spaced from one another so that the molten glass 40 contacts and passes over exposed portions 122c, 124c, 126c, 128c, 130c, 132c and 134c of those elements in a cascading manner, see FIG. 6a. Heat is removed from the stream 40 as the molten glass contacts and passes over the exposed portions 122c, 124c, 126c, 128c, 130c, 132c and 134c of the cooling elements 122, 124, 126, 128, 130, 132 and 134. Also, mixing of the molten glass occurs as a result of portions of the stream 40 contacting and flowing around the exposed portions 122c, 124c, 126c, 128c, 130c, 132c and 134c. Hence, the temperature distribution of a horizontal cross-section of the stream 40 taken below the heat transfer device 120 should be more uniform than the temperature distribution of a horizontal cross-section of the stream taken above the heat transfer device 120.

Figure 7:
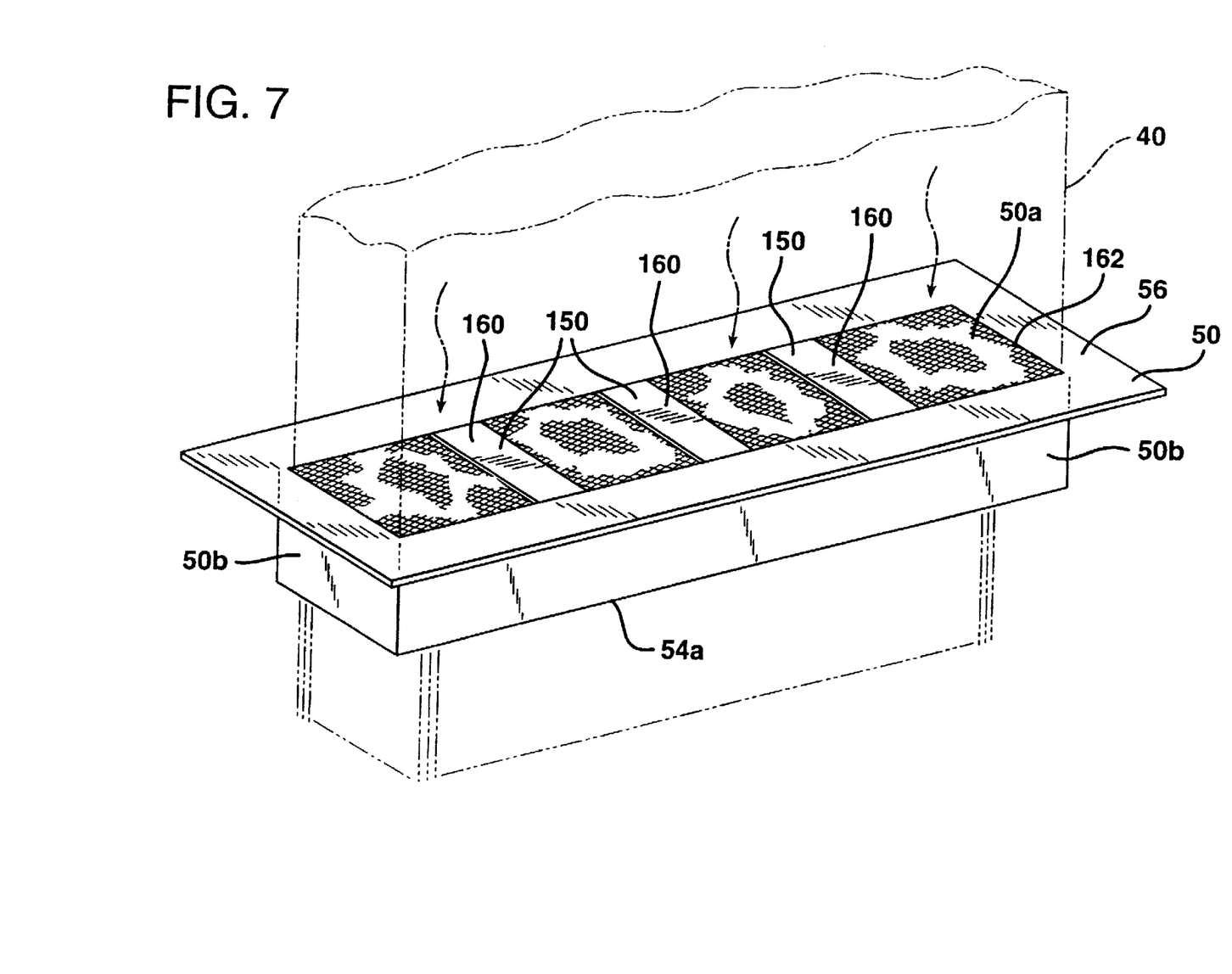
FIG. 7 is a perspective view of a heat transfer device constructed in accordance with a fourth embodiment of the present invention.

In accordance with a fourth embodiment of the present invention, a heat transfer device 150 is provided which comprises thickened metal portions or metal strips 160 integral with or fixedly secured to a metal bushing screen 162. The bushing screen 162 is located just inside the entrance 50a of the bushing 50, see FIG. 7. The metal strips 160, when engaged by the stream 40, remove heat from the stream 40. The metal strips 160 contact the outer walls 50b and the flange 56 of the bushing 50 such that heat is conductively transferred from the metal strips 160 to the outer walls 50b and the bushing flange 56. The metal strips 160 also effect mixing of the molten glass in the stream 40 resulting in a more uniform temperature distribution in the stream after it passes through the bushing screen 162. Typically, the screen 162 is located approximately 1 to 3 inches (0.03 to 0.08 meters) from the lower bushing tip plate 54a.

Typically, a number of bushings 50 are located along the length of a forehearth 30. Depending upon the location of a particular bushing 50 along the length of the forehearth 30, the side of the stream of molten glass 40 located closest to the melter may be hotter than the opposite side of the stream 40. However, because mixing of the molten glass is effected by the heat transfer device of the present invention, the temperature distribution of a horizontal cross section taken through the stream 40 after it passes the heat transfer device should be uniform regardless of the position of the bushing 50 along the length of the forehearth 30.

Because the heat transfer device of the present invention removes heat from the stream before it passes a significant distance into the bushing, heat removal is independent of the design of the bushing.

Having described the invention in detail and by reference to preferred embodiments thereof, it will be apparent that modifications and variations are possible without departing from the scope of the invention defined in the appended claims. For example, it is contemplated that end sections 84 of plate 82 may be formed as separate elements so as to be separate from the upper section 83 of the plate 82. The three separate sections 83 and 84 may be frictionally or otherwise held between the bushing block 76 and the forehearth 30 including its lower portion 34.

I claim:

1. A bushing assembly which is adapted to be positioned beneath a forehearth to receive a first stream of molten glass flowing from the forehearth comprising:

a glass receiving block adapted to be positioned adjacent to the forehearth so as to receive the first stream of molten glass flowing from the forehearth, said receiving block having an orifice through which the molten glass passes;

a bushing positioned to receive the first stream of molten glass from said glass receiving block and having a plurality of nozzles through which the first stream of molten glass passes, said nozzles supplying a plurality of second streams of molten glass to be drawn into continuous glass fibers; and at least one cooling element extending into the first stream of molten glass for removing energy in the form of heat from the first stream of molten glass and for redirecting the flow of the first stream to provide a more uniform temperature distribution in the first stream before it passes through said nozzles.

2. A bushing assembly as set forth in claim 1, wherein said at least one cooling element is interposed between said receiving block and said forehearth.

3. A bushing assembly as set forth in claim 1, further comprising a cooling coil which is associated with said at least one cooling element for conductively transferring heat away from said at least one cooling element.

4. A bushing assembly as set forth in claim 1, wherein said at least one cooling element comprises a generally planar cooling element having one or more bores through which at least a portion of the first stream of molten glass passes.

5. A bushing assembly as set forth in claim 1, wherein said at least one cooling element comprises first and second cooling elements extending into a generally central portion of the first stream of molten glass for removing heat from the molten glass and for redirecting the flow of the first stream of molten glass to provide a more uniform temperature distribution within the first stream of molten glass.

6. A bushing assembly as set forth in claim 5, further comprising third and fourth cooling elements which are mounted within said receiving block to extend into lateral portions of the first stream of molten glass to further redirect the flow of the first stream of molten glass to provide a more uniform temperature distribution within the molten glass and to remove additional heat from the first stream of glass.

7. A bushing assembly as set forth in claim 1, wherein said at least one cooling element comprises a thickened portion of a bushing screen associated with said bushing.

8. A bushing assembly as set forth in claim 1, wherein said at least one cooling element is interposed between said receiving block and said bushing.

9. A bushing assembly as set forth in claim 1, wherein said at least one cooling element comprises at least one cooling strip.

10. A bushing assembly as set forth in claim 1, wherein said at least one cooling element comprises at least one cooling rod.

11. A bushing assembly as set forth in claim 1, wherein said at least one cooling element comprises at least one cooling tube.

12. A heat transfer device for use with a bushing having a plurality of tips, a receiving block and a forehearth for removing energy in the form of heat from a stream of molten glass passing from said forehearth, through an orifice in said receiving block and through said bushing, said heat transfer device comprising:

at least one cooling element extending into the stream of molten glass, said cooling element transferring energy in the form of heat away from said molten glass and for redirecting the flow of the stream of molten glass to provide a more uniform temperature distribution in the stream of molten glass.

13. A heat transfer device as set forth in claim 12, wherein said at least one cooling element is interposed between said receiving block and said forehearth.

14. A heat transfer device as set forth in claim 12, further comprising a cooling coil which is associated with said at least one cooling element for conductively transferring heat away from said at least one cooling element.

15. A heat transfer device as set forth in claim 12, wherein said at least one cooling element comprises a cooling element having one or more bores through which at least a portion of the molten glass passes.

16. A heat transfer device as set forth in claim 12, wherein said at least one cooling element comprises first and second cooling elements which are positioned so as to extend into a generally central portion of the stream of the molten glass to redirect the flow of the molten glass to provide a more uniform temperature distribution within the stream of molten glass.

17. A heat transfer device as set forth in claim 16, further comprising third and fourth cooling elements which are mounted within said receiving block so as to extend into lateral portions of the stream of molten glass to further redirect the flow of the molten glass to provide a more uniform temperature distribution within the stream of molten glass.

18. A heat transfer device as set forth in claim 12, wherein said at least one cooling element comprises a thickened portion of a bushing screen associated with said bushing.

19. A heat transfer device as set forth in claim 12, wherein said at least one cooling element is interposed between said receiving block and said bushing.

20. A bushing assembly adapted to be positioned beneath a forehearth to receive a first stream of molten glass flowing from the forehearth, said bushing assembly comprising:

a bushing block defining an orifice, wherein said first stream of molten glass defines a higher temperature stream portion and a lower temperature stream portion within said orifice;

a bushing positioned to receive the first stream of molten glass from said bushing block, said bushing having a plurality of nozzles through which the first stream of molten glass passes, said nozzles supplying a plurality of second streams of molten glass to be drawn into continuous glass fibers; and at least one cooling element positioned outside of said lower temperature stream portion of said first stream of molten glass and extending into the higher temperature stream portion of said first stream of molten glass.

* * * * *